(12) United States Patent
Stulken et al.

(10) Patent No.: US 10,175,388 B2
(45) Date of Patent: *Jan. 8, 2019

(54) 4D VOLUMETRIC WEATHER DATA PROCESSING AND DISPLAY

(71) Applicant: THE BOEING COMPANY, Chicago, IL (US)

(72) Inventors: David Eugene Stulken, Madison, WI (US); Peter James Batsakes, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,806

(22) Filed: Apr. 17, 2018

(65) Prior Publication Data
US 2018/0306946 A1 Oct. 25, 2018

Related U.S. Application Data

(63) Continuation of application No. 14/456,471, filed on Aug. 11, 2014, now Pat. No. 9,958,573.

(51) Int. Cl.
*G01W 1/10* (2006.01)
*G08G 5/00* (2006.01)
*G06Q 10/04* (2012.01)
*G01C 23/00* (2006.01)

(52) U.S. Cl.
CPC ............... *G01W 1/10* (2013.01); *G01C 23/00* (2013.01); *G06Q 10/047* (2013.01); *G08G 5/0013* (2013.01); *G08G 5/0021* (2013.01); *G08G 5/0052* (2013.01); *G08G 5/0091* (2013.01)

(58) Field of Classification Search
CPC combination set(s) only.
See application file for complete search history.

*Primary Examiner* — Nabil H Syed
*Assistant Examiner* — Cal J Eustaquio
(74) *Attorney, Agent, or Firm* — Patterson + Sheridan, LLP

(57) ABSTRACT

Method, system, apparatus, and computer program product for displaying weather data on a computer display screen. Weather data for use in a flight of an aircraft is received. The weather data is updated at a first rate. The weather data is separated into weather data layers for a plurality of ranges of altitude. Each weather data layer corresponds to a respective one of the plurality of ranges of altitude, and the weather data is separated at the first rate. Embodiments monitor for a selection of at least one of the weather data layers. The monitoring is performed periodically at a second rate, and the second rate is faster than the first rate. Weather data in the selected at least one of the weather data layers is prepared for display and the weather data is output for display on a display screen in the aircraft.

20 Claims, 9 Drawing Sheets

US 10,175,388 B2

4D VOLUMETRIC WEATHER DATA PROCESSING AND DISPLAY

CROSS-REFERENCE TO RELATED APPLICATIONS

This application is a continuation of co-pending U.S. patent application Ser. No. 14/456,471, filed Aug. 11, 2014. The aforementioned related patent application is herein incorporated by reference in its entirety.

BACKGROUND

Embodiments described herein relate to providing weather and/or atmospheric data.

SUMMARY

According to certain embodiments, a method can include receiving weather data for use in a flight of an aircraft. The weather data can be updated at a first rate, meaning that new weather information can be provided to the aircraft at a predetermined interval (e.g., every minute). The method can further include separating the weather data into weather data layers for a plurality of ranges of altitude. Each weather data layer can correspond to a respective one of the plurality of ranges of altitude. The separating of the weather data can be performed at the first rate (e.g., such that updated weather data is separated after it is received). The method can further include monitoring for a selection of at least one of the weather data layers (e.g., a selection by a pilot). The monitoring can occur at a second rate (e.g., once every second) that is faster than the first rate. The method can further include preparing for display the weather data in the selected at least one weather data layers. The method can further include outputting, for display on a computer display screen in a flight deck of the aircraft, the weather data in the selected at least one of the weather data layers.

According to certain embodiments, a system can include a receiver configured to receive weather data for use in a flight of an aircraft. The weather data can be received at a first rate, meaning that updated weather information is received by the aircraft periodically (e.g., once per minute). The system can also include an interface in the flight deck of the aircraft configured to receive selections from a pilot of the aircraft. The system can also include a memory that can store the received weather data. The system can also include a computer display screen configured to display weather data. The system can also include a first computer processor that is programmed to separate the received weather data into weather data layers for a plurality of ranges of altitude. Each weather data layer can correspond to a respective one of the plurality of ranges of altitude. The first computer process can separate the received weather data at the first rate (e.g., such that updated weather data is separated after it is received). The system can also include a second computer processor that is programmed to monitor the interface for a selection of at least one of the weather data layers. The second computer processor can monitor at a second rate (e.g., once every second) that is faster than the first rate. The second computer processor can prepare for display of the weather data in the selected weather data layers. The second computer processor can prepare the weather data for display at the second rate. The second computer processor can output, for display on a computer display screen, the weather data in the selected at least one of the weather data layers.

According to certain embodiments, a non-transitory computer-readable medium can include computer program code that, when executed by operation of one or more computer processors, performs an operation that includes receiving weather data for use in a flight of an aircraft. The weather data can be updated at a first rate, meaning that new weather information can be provided to the aircraft at a predetermined interval (e.g., every minute). The operation can further include separating the weather data into weather data layers for a plurality of ranges of altitude. Each weather data layer can correspond to a respective one of the plurality of ranges of altitude. The separating of the weather data can be performed at the first rate (e.g., such that updated weather data is separated after it is received). The method can further include monitoring for a selection of at least one of the weather data layers (e.g., a selection by a pilot). The monitoring can occur at a second rate (e.g., once every second) that is faster than the first rate. The operation can further include preparing for display the weather data in the selected at least one weather data layers. The operation can further include outputting, for display on a computer display screen in a flight deck of the aircraft, the weather data in the selected at least one of the weather data layers.

BRIEF DESCRIPTION OF ILLUSTRATIONS

DETAILED DESCRIPTION

Figure 3A:
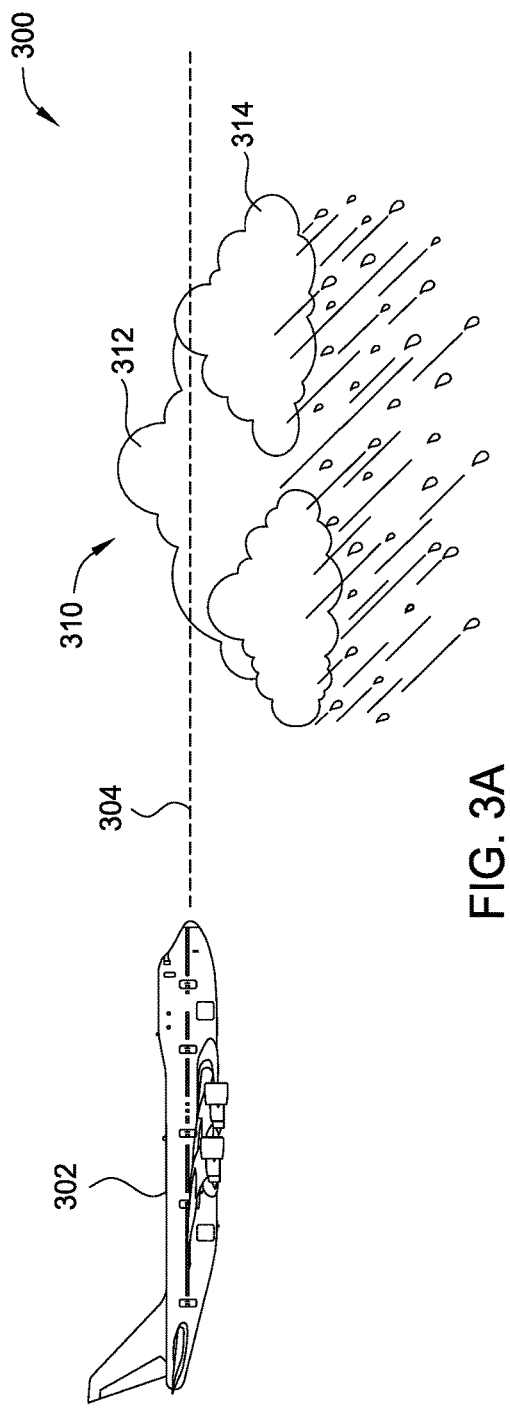
FIG. 3A illustrates a first exemplary weather scenario for an aircraft during a flight.
Figure 3B:
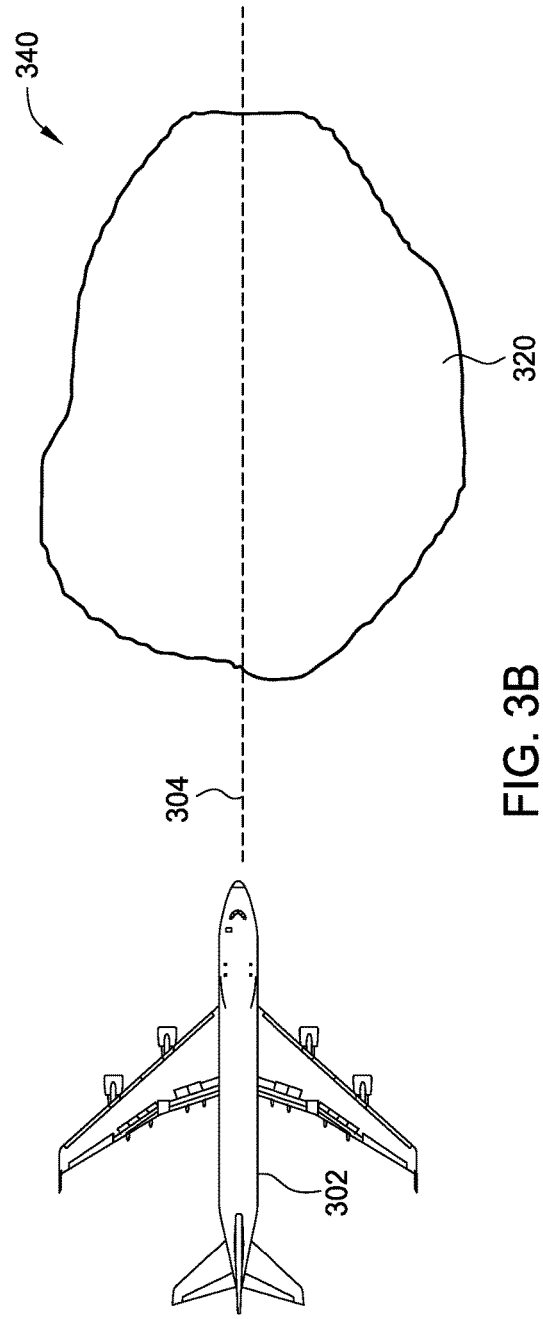
FIG. 3B illustrates an exemplary view of a display screen on the flight deck of the aircraft that depicts the weather scenario of FIG. 3A.

As data communications technology improves, computer systems on board aircraft are capable of receiving weather information from ground-based and/or satellite-based systems that can augment on board radar and the like. As used herein, the term weather data can refer to data related to any atmospheric state or occurrence in the atmosphere that may affect the flight of an aircraft. Examples of weather data can include clouds, rain, hail, icing, lightning, winds, turbulence, regions reported to be free of turbulence, convective activity, and fog. Other examples of weather data may include volcanic activity, reports of flocks of birds, or the like. The weather information can be displayed in a top-down format or a three-dimensional perspective-view format on a display screen, such as on a moving map display, in the flight deck. However, the sheer amount of weather data available for display can easily clutter such a moving map display. Additionally, current displays do not differentiate between weather data that is more relevant to a particular aircraft (e.g., weather proximate to a flight altitude of the aircraft) and weather data that is less relevant to the particular flight. FIGS. 3A and 3B illustrate an exemplary weather scenario 300 in which an aircraft 302 is flying along a flight path 304 toward a weather region 310. The flight path 304 can be a calculated trajectory or direction of travel of the aircraft 302. For example, in certain instances, the aircraft 302 may be following a flight plan entered into a flight management computer (FMC) that includes a sequence of planned or predicted flight directions, altitudes, speeds, etc. that the aircraft 302 follows to reach its destination. In such instances, the calculated trajectory of the aircraft 302 can be the flight plan. In various other circumstances, the aircraft 302 may be hand-flown by pilots or flown on autopilot following heading, altitude, and airspeed commands entered by the pilots (e.g., entered into the FMC or entered into a Mode Control Panel (MCP)). In such instances, the calculated trajectory of the aircraft 302 can be a direction of travel of the aircraft 302. In the exemplary weather scenario 300, the weather region 310 includes an upper portion 312 that is at or above the flight path 304 of the aircraft 302. The weather region 310 also includes a lower portion 314 that is below the flight path 304 of the aircraft. In certain circumstances, only the weather at or above the flight path 304 of the aircraft 302 may be more relevant. Referring now to FIG. 3B, a display screen 340 may show a representation 320 of the weather region 310 that includes both the more relevant upper portion 312 and the less relevant lower portion 314 of the weather region 310. As a result, the display screen 340 may be needlessly cluttered. The representation 320 can be prepared from weather data that includes the weather region 310.

Figure 1:
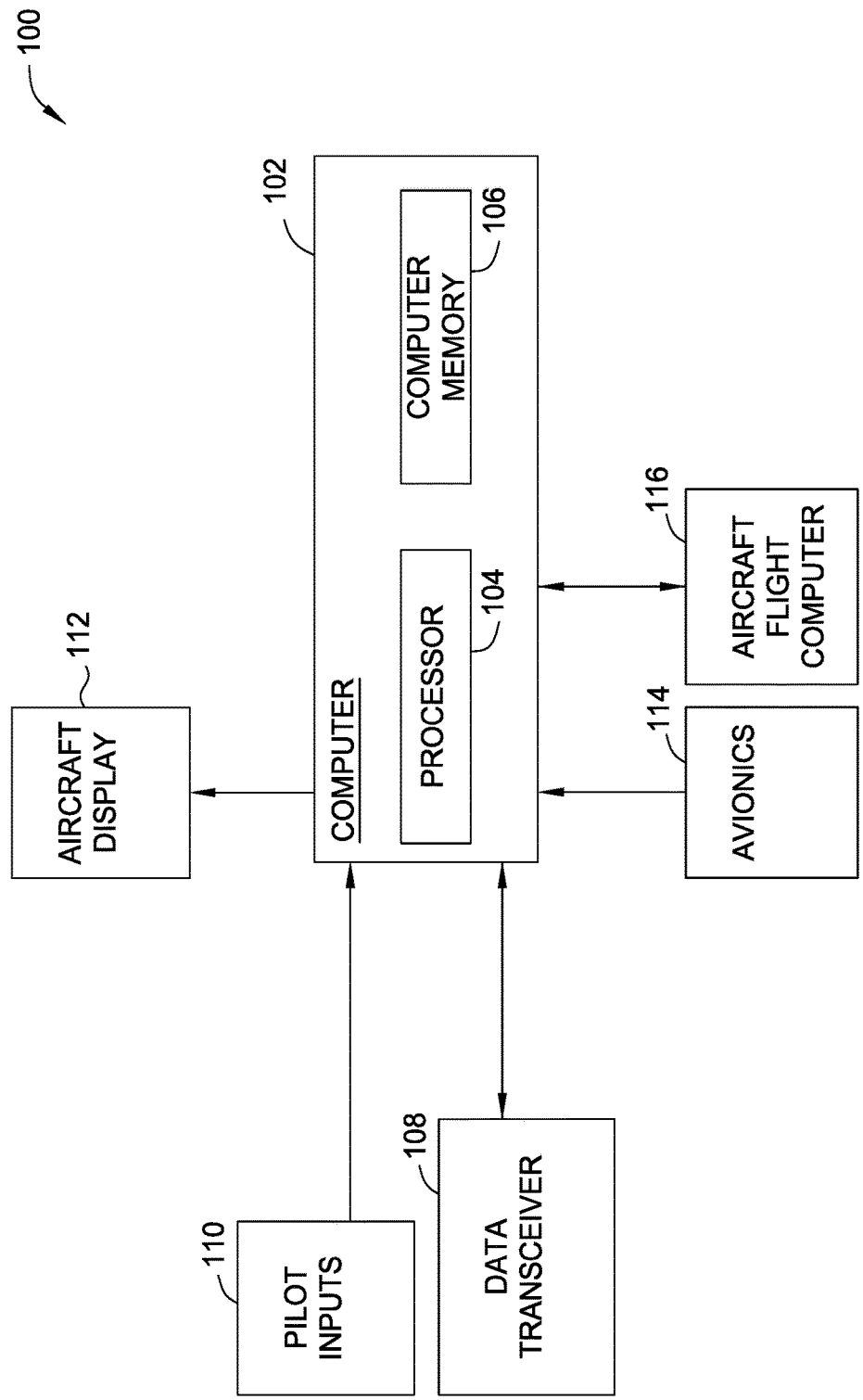
FIG. 1 is a block diagram of an embodiment of a system for displaying weather information on a display screen on a flight deck of an aircraft.

With reference now to FIG. 1, embodiments of the weather display system 100 can include a computer 102 in communication with an aircraft display 112. The computer 102 can include a processor 104, and computer memory 106. The processor 104 can be any type of computing processor, such as a central processing unit, a graphical processing unit, a general processor, and/or a specialized processor. The computer memory 106 can store one or more computer algorithms that provide for the presentation of weather information on the aircraft display 112 (among other information being displayed). The computer memory 106 can also store received weather information, as well as weather information generated on board an aircraft for transmission to the ground. The aircraft display 112 can be any display screen on the flight deck in an aircraft. For example, the aircraft display 112 can be a navigation display on a main instrument panel, an Engine Indicating and Crew Alerting System (EICAS) display, an Electronic Flight Bag (EFB) display, and/or a display on a personal computer (e.g., laptop, tablet computer, or smart phone).

Figure 7:
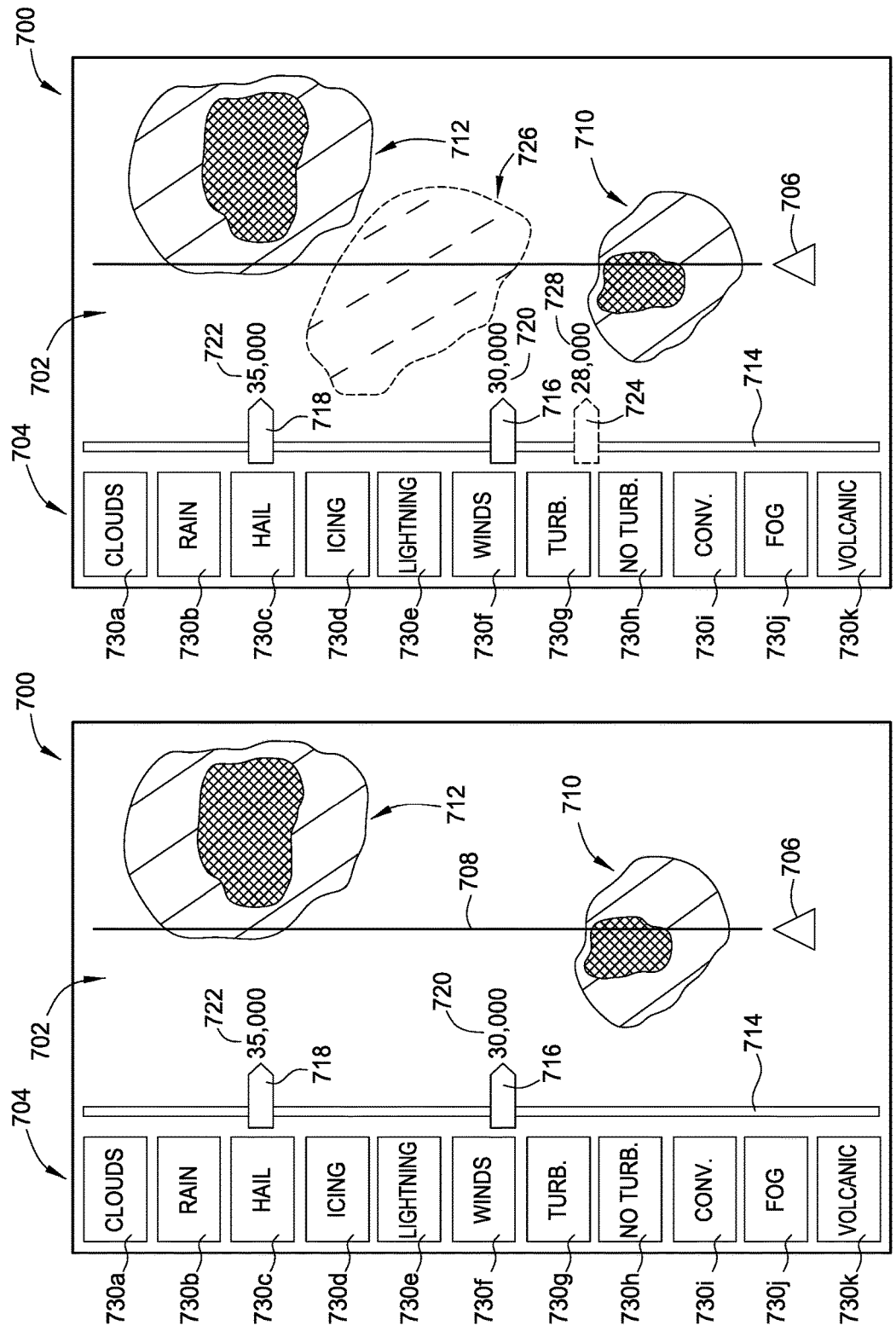
FIG. 7A illustrates an exemplary display screen with controls for selecting weather products and displayed altitudes.
FIG. 7B illustrates the exemplary display screen of FIG. 7A wherein suggested ranges of displayed altitudes and suggested selected products are highlighted.

The computer 102 can also be in communication with pilot inputs 110, a data transceiver 108, aircraft avionics, 114, and/or an aircraft flight computer (e.g., a Flight Management System (FMS)). The pilot inputs 110 can include controls that a pilot may use to select a range of altitudes for which he wishes to display weather information and also to select various weather products the pilot wishes to display. The pilot inputs 110 can also enable the pilot to control and/or select display preferences (e.g., alpha blending, described below). The controls can include use-specific knobs, dials, buttons, etc. that a pilot may use to make selections. The controls can also include a graphical user interface (see e.g., FIGS. 7A and 7B) that a pilot might interact with using a mouse, cursor control, and/or a touch screen. Referring to FIG. 7A, the controls can include a graphical user interface with a slider bar 714 as well as an upper altitude slider 718 and a lower altitude slider 716 displayed in a pilot control field 704 on a display screen 700. An upper altitude field 722 can be associated with the upper altitude slider 718 and a lower altitude field 720 can be associated with the lower altitude slider 716. In various embodiments, the display screen 700 can include a touch screen, and a pilot may touch the display screen 700 proximate to the altitude sliders 718 and 716 to move the sliders and adjust a range of altitudes for which weather is to be displayed. In various embodiments, one or more toggle switches can be provided near the display screen 700, wherein a first toggle switch can be operated by the pilot to move the upper altitude slider 718, and a second toggle switch can be operated by the pilot to move the lower altitude slider 716. In various other embodiments, a single toggle can be provided that enables a pilot to select a particular altitude and the processor 104 can then select a range of altitudes based on the particular altitude. For example, the processor 104 may select a predefined range of altitudes extending 2,000 feet above and 2,000 feet below the particular altitude selected by the pilot. As another example, the processor 104 may select an asymmetric range of altitudes, such as 1,000 feet above the particular altitude and 2,000 feet below the particular altitude. As another example, the processor 104 may select different ranges of altitudes based on the phase of flight. For example, during a climb phase of flight, the processor 104 may select an altitude range extending 1,000 feet below the particular altitude and 10,000 feet above the particular altitude. By contrast, during a descent phase of flight, the processor 104 may select a predefined altitude range extending from the particular altitude to 10,000 feet below the particular altitude. The pilot control field 704 can also include a graphical user interface to enable a pilot to select different weather products for display. Each weather product can correspond to a type of weather data that can be displayed. For example, the display screen 700 can include graphical buttons 730a-k that a pilot can select to display various weather products. For example, if the pilot is interested in a cloud coverage weather product, then the pilots can select button 730a to view cloud information on the display screen 700. In various embodiments in which the display screen 700 comprises a touch screen display, the pilots can touch the display screen 700 proximate to the button he wishes to select. In various other embodiments, buttons, switches, or the like can be arranged proximate to the display screen 700 to select the various buttons 730a-k. For example, a frame around the display screen 700 can include soft keys. The displayed buttons 730a-k can be arranged to align with the soft keys.

In various embodiments, the data transceiver 108 can receive various weather data from ground-based and/or satellite based sources. The data transceiver 108 may also receive various weather data from other aircraft. For example, the data transceiver 108 may receive weather data from ground-based large area radar. The data transceiver 108 can also send weather data to the ground, other aircraft, and/or satellites. For example, weather data gathered on board the aircraft (e.g. on board radar, onboard temperature readings, turbulence, and/or on board humidity readings) can be transmitted to ground-based systems, other aircraft, and/or satellites. In various embodiments, the data transceiver 108 can also send requests for weather data to ground-based systems, other aircraft, and/or satellite-based systems. For example, a weather data request may include a current and/or future position of the aircraft (wherein the weather data request includes data related to weather proximate to the current or future position of the aircraft), a planned flight path (i.e., trajectory) or route of the aircraft (wherein the data request includes data related to weather proximate to the route of the aircraft), a destination airport of the aircraft (wherein the data request includes data related to weather proximate to the destination airport of the aircraft), and an alternate airport of the aircraft (wherein the data request includes data related to weather proximate to the alternate airport of the aircraft).

The data transceiver 108 can include any type of communication protocol. For example, the data transceiver 108 can include an Internet connection (e.g., a wired or wireless Ethernet port in communication with Internet router and/or switch) provided via a service such as Gogo®, Row 44®, or the like. The data transceiver 108 can also include other forms of wireless communication, such as Bluetooth or a cellular data connection. The data transceiver 108 can also use other existing information systems on board the aircraft, such as VHF radio, HF radio, UHF radio, satellite communications, and/or Aircraft Communication Addressing and Reporting System (ACARS) communications.

The computer 102 can also receive information from various avionics 114 on board the aircraft. For example, the avionics 114 may provide the current altitude, airspeed, and heading of the aircraft to the computer 102. The avionics 114 may also provide the position of the aircraft (e.g., from a global positioning satellite (GPS) system, an inertial navigation system (INS), and/or radio beacon fixes). The avionics 114 can also provide information about a phase of flight of the aircraft as well as a time of the day. The avionics 114 can also provide information about the weather data gathered on board the aircraft to the computer 102. For example, the avionics 114 can provide to the computer 102 on board radar data, ambient temperature data, and/or ambient humidity data.

In various embodiments, the computer 102 can also communicate with an aircraft flight computer (e.g., a flight management system (FMS)). The aircraft flight computer 116 can provide to the computer 102 a current intended flight path of the aircraft (according to a predetermined flight plan). In various embodiments, the computer 102 can provide to the aircraft flight computer 116 suggested changes to the flight plan (and thereby the flight path) to avoid detected weather. In such embodiments, when the computer 102 suggests changes to the flight plan, the aircraft flight computer 116 may prompt the pilot to accept and/or execute the changes to the flight plan.

Figure 2A:
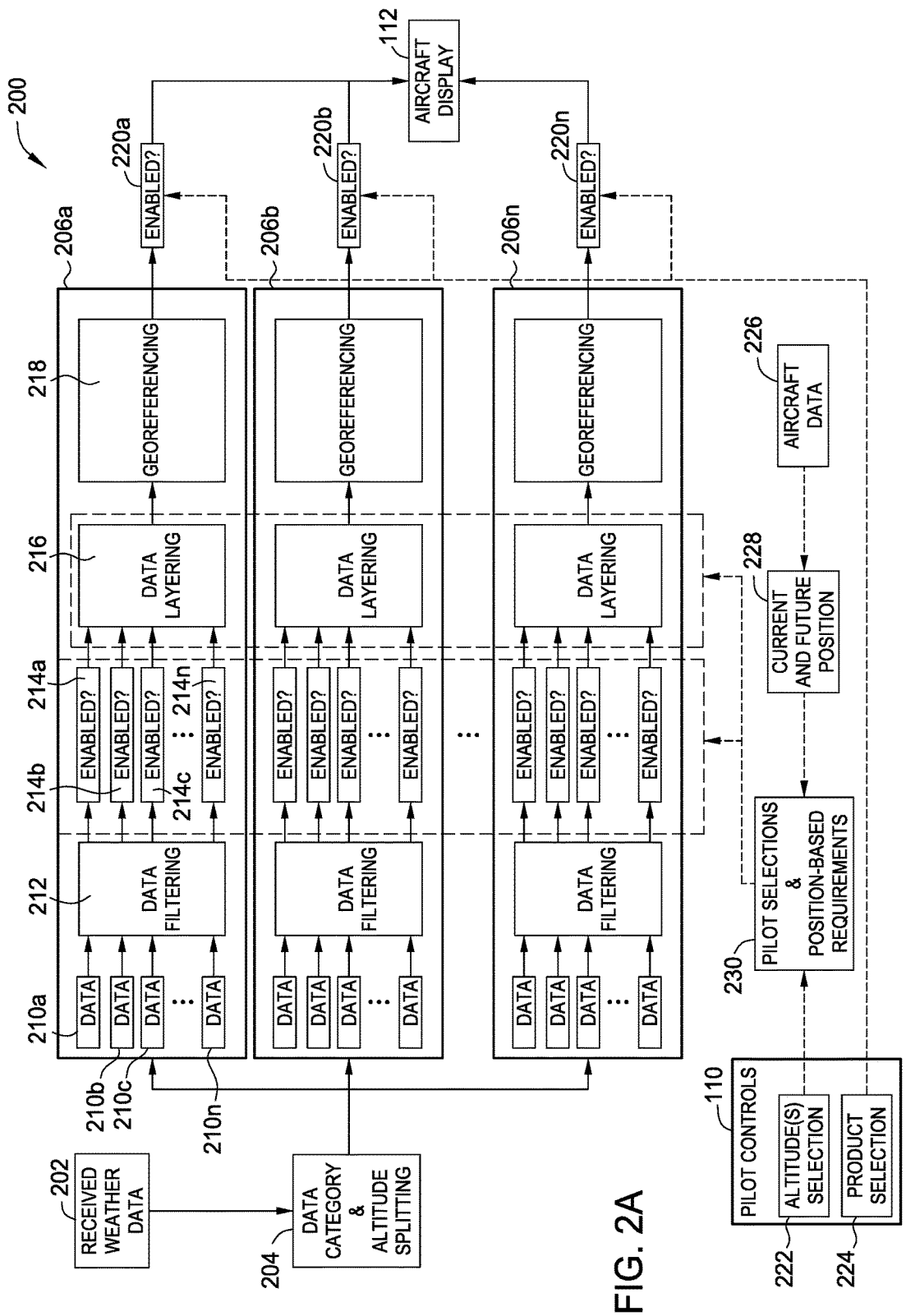
FIG. 2A is a block diagram illustrating an embodiment of a process for displaying weather information related to multiple weather products on the display screen of FIG. 1 based on pilot-input settings and aircraft trajectory.
Figure 2B:
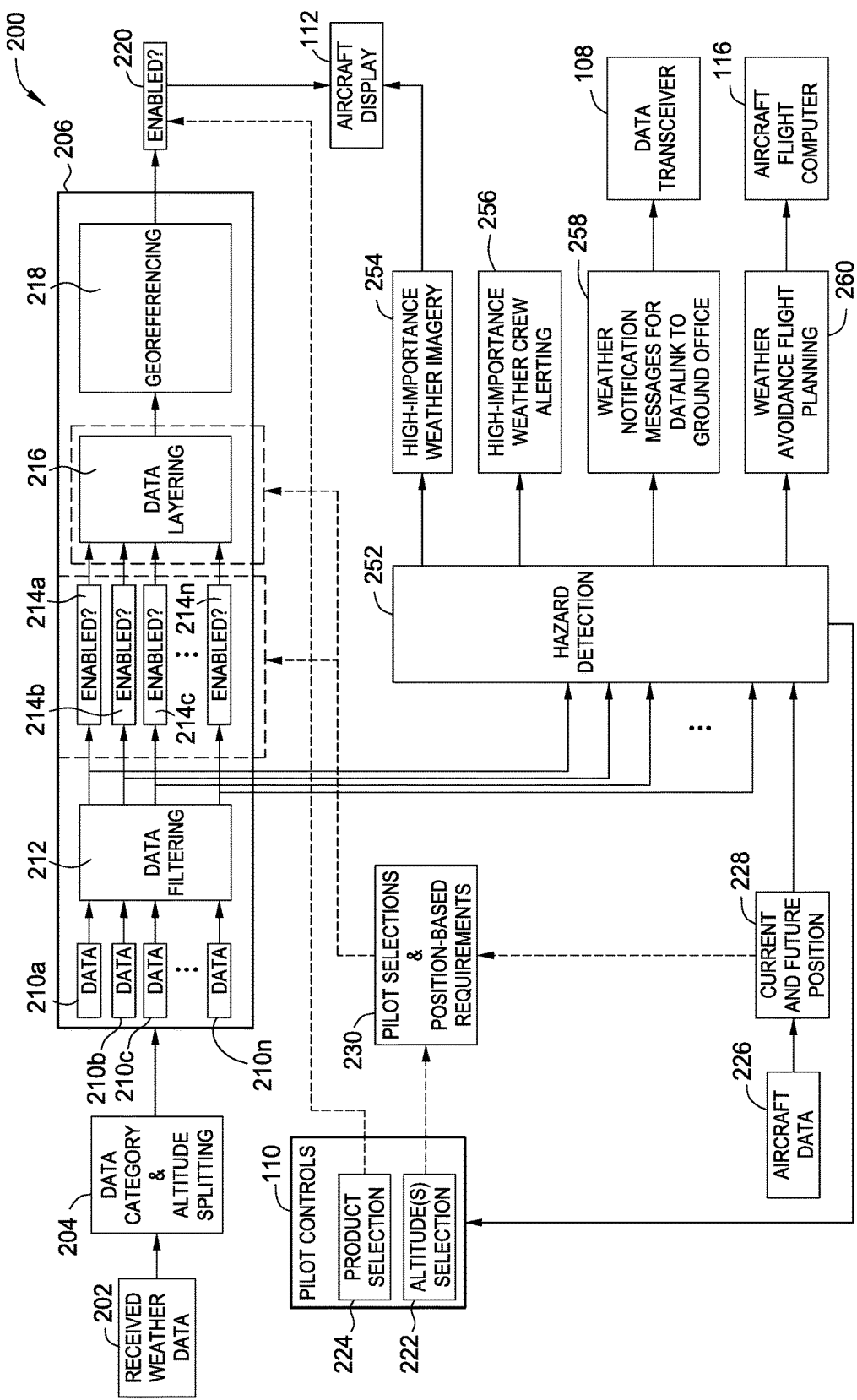
FIG. 2B is a block diagram illustrating the process of FIG. 2A (simplified to show only a single weather product) in combination with an embodiment of a process for providing automated weather monitoring and alerting and providing suggested settings to the pilot.

FIGS. 2A and 2B illustrate an embodiment of processes 200 that the processor 104 can implement (e.g., based on algorithms stored in the computer memory 106) to display weather information on an aircraft display 112 (e.g., a display screen) on the flight deck of an aircraft. Solid arrows between blocks in FIGS. 2A and 2B represent communication of data relevant to displaying weather (e.g., weather data and aircraft position, speed, and heading data). Broken-line arrows between blocks in FIGS. 2A and 2B represent communication of control signals. In block 202, weather data can be received (e.g., via the data transceiver 108) and stored in computer memory 106. In block 202, the processor 104 can provide data integrity checks on the weather data. For example, the processor 104 can check to ensure that the weather data is intact without any errors. Also, in instances where the weather data is received over an Internet connection, the processor 104 can check to determine that the weather data is clean (e.g., contains no computer viruses or other malware). Also, in block 202, the processor 104 can provide any data decompression on the received weather data. In block 204, the processor 104 can split the weather data out into different weather products. Each type of weather data (e.g., clouds, rain, hail, icing, lighting, winds, turbulence, etc.) can be a weather product that can be selected for display. For example, referring again to FIG. 7A, the received weather data can include different weather products such as clouds (selected by button 730a), rain (selected by button 730b), hail (selected by button 730c), icing (selected by button 730d), lightning (selected by button 730e), winds (selected by button 730f), turbulence (selected by button 730g), no turbulence (selected by button 730h), convection (selected by button 730i), fog (selected by button 730j), and volcanic activity (selected by button 730k). Referring again to FIG. 2A, each weather product can be processed by a different process pipeline. For example, a first weather product (e.g., rain (selected by button 730b)) can be processed by a first process pipeline 206a, a second weather product (e.g., hail (selected by button 730c)) can be processed by a second process pipeline 206b, and an nth weather product (e.g. lightning (selected by button 730c) can be processed by an nth process pipeline 206n. For illustration purposes, only the processes within a first pipeline 206a are being described in detail herein. However, the processes within the second through nth pipelines can be similar.

Referring to blocks 210a-n within a particular pipeline (e.g., pipeline 206a), the processor 104 can split the weather data for the weather product being processed into different altitude bands. For example, the weather data may be split into bands of 100 feet, 500 feet, or 1,000 feet. As an illustration, block 210n may represent weather data (for the particular weather product) from ground level to 500 feet, block 210c may represent data from 21,001 feet to 21,500 feet, block 210b may represent data from 21,501 feet to 22,000 feet, and block 210a may represent data from 22,001 feet to 22,500 feet, for example. In various embodiments, the different altitude bands encompass at least the maximum altitude that the aircraft is capable of achieving. In various embodiments, the different altitude bands may extend beyond an aircraft's operating ceiling (e.g., to show the maximum height of a storm, which can be used by pilots to estimate the severity of the storm).

Referring now to block 212, the processor 104 can apply data filtering to change a processing speed and/or a sampling rate for the weather data. For example, the data transceiver 108 may receive weather data at a rate of once per minute. However, the aircraft display 112 should be able to be updated much more frequently. For example, if the pilot changes the viewing selections via the pilot inputs 110, the aircraft display 112 should update to reflect the changed selections almost immediately. As a result, processing of the data should occur at a faster rate (e.g. one time per second (1 Hz), 5 times per second (5 Hz), or 10 times per second (10 Hz)). Thus, in block 212, the processor 104 can sample the altitude-split data from blocks 210a-n at the faster rate.

After the sampling rate has been changed, each altitude band of weather data can go through a decision block 214a-n to determine whether further processing is called for. As shown in FIG. 2A, the decision blocks 214a-n can be controlled by a combination of pilot-selected altitude ranges and computer-selected altitude ranges (block 230). As discussed above, pilot inputs 110 can include altitude selections 222, wherein the pilot selects a range of altitudes of weather information for display. However, the computer 102 may select additional altitude ranges based on flight conditions and/or airline standard operating procedures. For example, the airline's standard operating procedures may require that its aircraft be flown at least 5,000 feet above a weather system. Therefore, embodiments of the computer 102 may automatically select a range of altitudes extending from a current altitude of the aircraft to an altitude of 5,000 feet below the aircraft. As another example, an airline's standard operating procedures may require that its aircraft be flown at least 3,000 feet below known icing conditions. Thus, embodiments of the computer 102 may automatically select a range of altitudes extending from a current altitude of the aircraft to an altitude of 3,000 feet above the aircraft. Aircraft data (block 226) (received from avionics 114 and/or the aircraft flight computer 116) can be used to determine a current position and predict future positions (block 228) of the aircraft. At block 230, the computer 102 can select altitude ranges based on the current position and predicted future positions of the aircraft. For example, if the aircraft is climbing, then the computer 102 may automatically select additional altitude bands above currently-selected altitude bands and automatically de-select altitude bands at the bottom of a range of selected altitude bands at time intervals as the aircraft climbs. For example, if the altitude bands are each 500 feet and the aircraft is climbing at a rate of 500 feet per minute, then every minute, the computer 102 may add one additional 500 foot altitude band above the top-most currently-selected altitude band and de-select the bottom-most currently selected altitude band. If the aircraft is climbing at a rate of 1,000 feet per minute, then every thirty seconds, the computer 102 may add one additional 500 foot altitude band above the top-most currently-selected altitude band and de-select the bottom-most currently selected altitude band. Similarly, if the aircraft is descending, then the computer 102 may automatically select additional altitude bands below currently-selected altitude bands and automatically de-select altitude bands at the top of a range of selected altitude bands at time intervals as the aircraft descends. The computer 102 can combine its selected altitude ranges with the pilot selected altitude ranges (block 230). The computer 102, at block 214a-n, can then enable or disable each of the altitude bands of weather data 210a-n based on the combined selection of altitude ranges.

In block 216, the computer 102 can prepare the enabled altitude bands of weather data for display on the aircraft display 112. In various embodiments, weather data can be displayed on the aircraft display 112 in a top down view. Furthermore, in various instances, weather at or above the altitude of an aircraft may be more important than weather below the altitude of the aircraft. Therefore, in various embodiments, the data layering in block 216 can start by drawing the weather data from the lowest enabled altitude band. Successively higher altitude bands can be drawn on top of the lowest enabled altitude band until the top-most altitude band has been drawn. As a result, weather data for altitude bands at or above the current altitude of the aircraft may not be not hidden behind weather data for altitude bands below the current altitude of the aircraft.

Figure 4A:
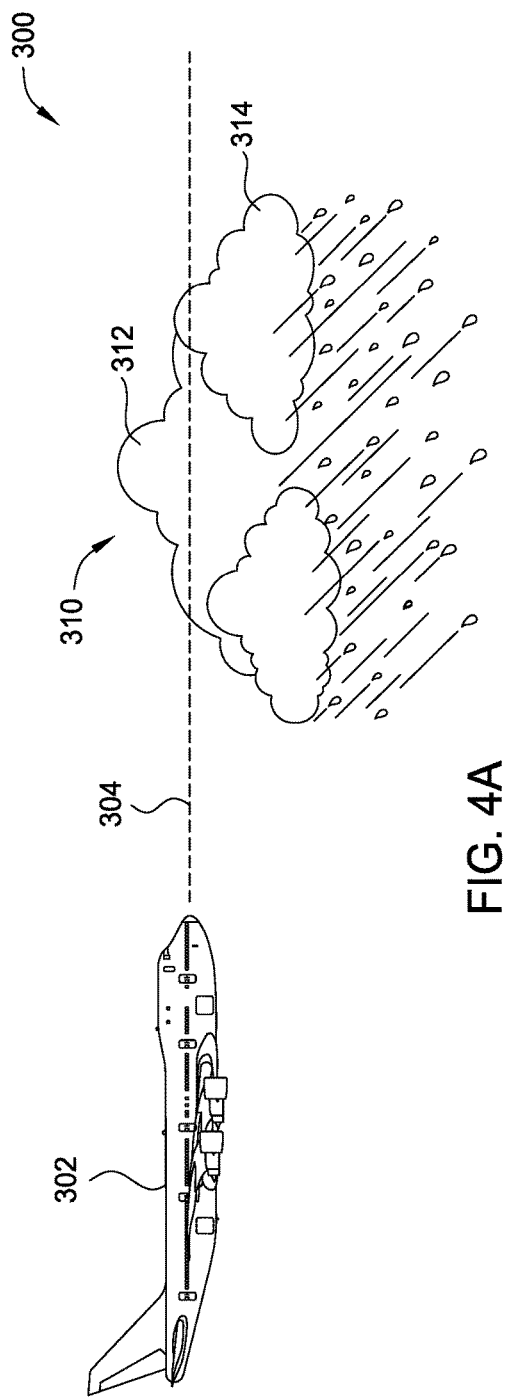
FIG. 4A illustrates the first exemplary scenario for the aircraft during the flight.
Figure 4B:
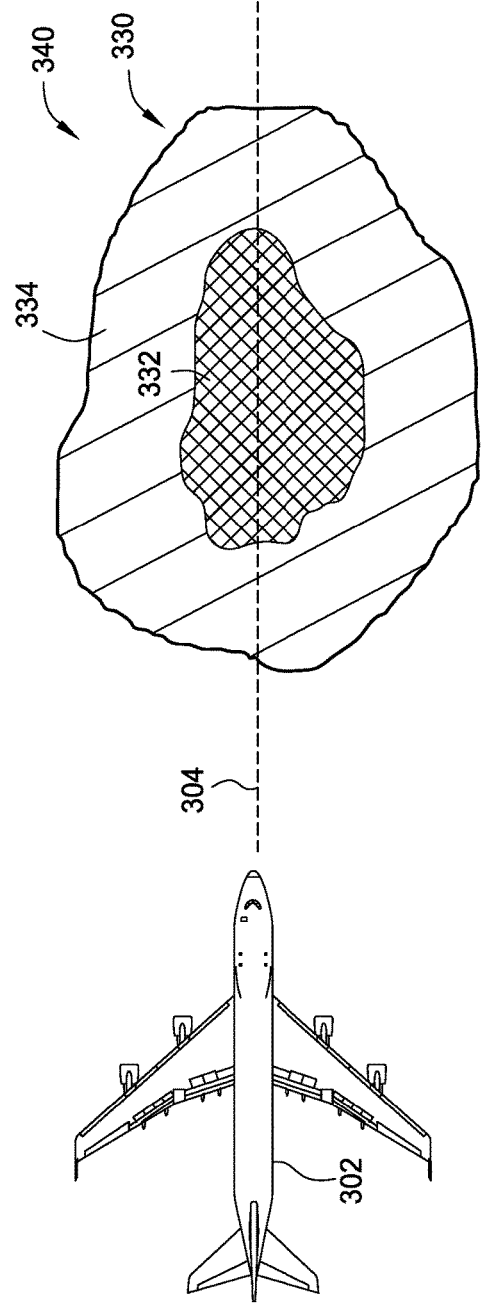
FIG. 4B illustrates an exemplary view of a display screen on the flight deck of the aircraft according to various embodiments that depicts the weather scenario of FIG. 4A.

In various embodiments, the weather data can be alpha blended (i.e., alpha composited) (e.g., to prioritize data at certain altitude bands). Alpha blending is a process of combining an image with a background image to create the appearance of partial or full transparency. In various embodiments, at least some of the enabled altitude bands of weather data 210a-n can be alpha blended with a background on the aircraft display 112. For example, referring to FIGS. 4A and 4B, weather data in altitude bands at or above the current altitude of an aircraft, can be fully opaque and weather data in altitude bands below the current altitude of an aircraft may be alpha blended to one or more levels of transparency. Referring to the exemplary scenario 300 shown in FIG. 4A, an aircraft 302 may be flying along a flight path 304 that may intersect a weather region 310 (e.g., a storm). As shown in FIG. 4A, an upper portion 312 of the weather region 310 is at or above the flight path 304 and a lower portion 314 of the weather is below the flight path 304. Referring to FIG. 4B, a computer display of the storm 330 may include a fully opaque portion 332 that represents the upper portion 312 of the weather region 310 that is at or above the flight path 304 of the aircraft 302. The computer display of the storm 330 can also include a partially transparent portion 334 that represents the lower portion 314 of the weather region 310 that is below the flight path 304 of the aircraft 302. In various embodiments, the partially transparent portion 334 can include a single degree of transparency (e.g., 25% transparent, 50% transparent, or 75% transparent). In various embodiments, the partially transparent portion 334 can include multiple levels of transparency. For example, a computer display of weather may be drawn such that displayed weather closer to (but below) the flight path of the aircraft is less transparent than weather further below the aircraft. For example, weather that is between 0 and 500 feet below the flight path 304 of the aircraft 302 may be 75% opaque (i.e., 25% transparent), weather that is 501 feet to 1,000 feet below the flight path 304 of the aircraft 302 may be 50% opaque, and weather that is more than 1,000 feet below the flight path 304 of the aircraft 302 may be 25% opaque. Referring again to FIG. 2A, the pilot controls can include display options that enable the pilots to control and/or adjust aspects of alpha blending, or the like, to suit individual preferences.

Figure 5A:
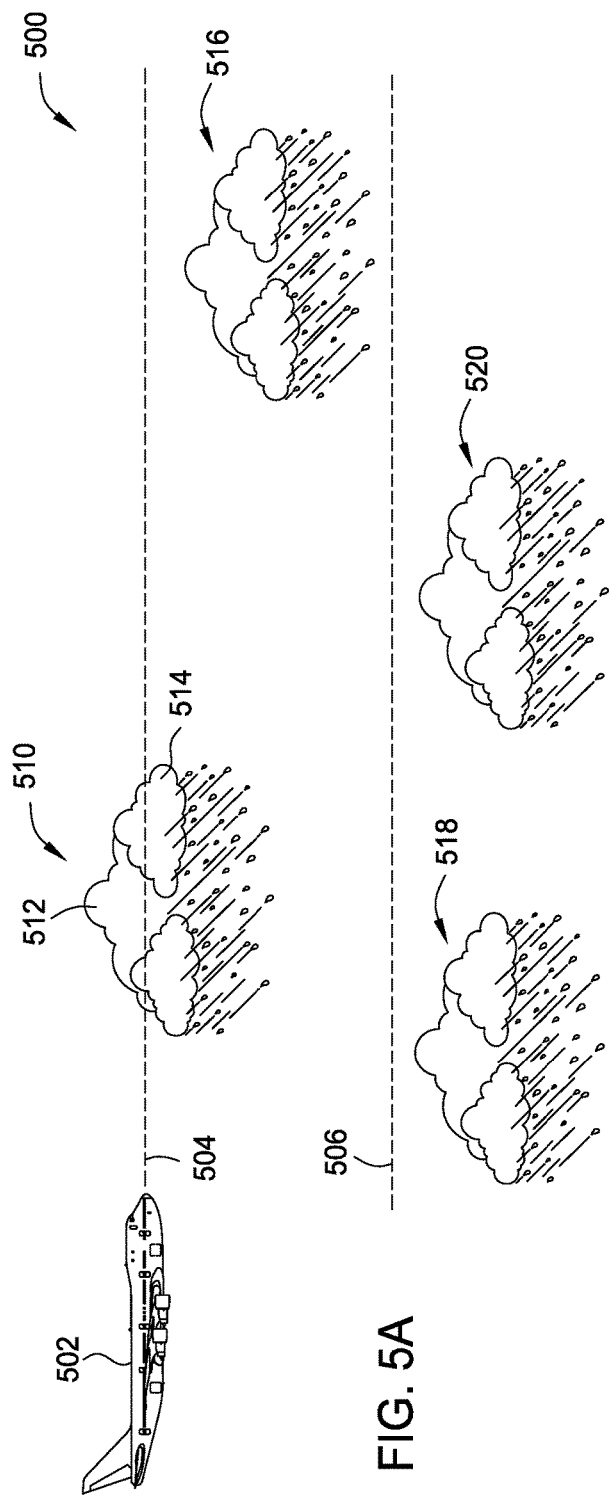
FIG. 5A illustrates a second exemplary weather scenario for an aircraft during a flight.
Figure 5B:
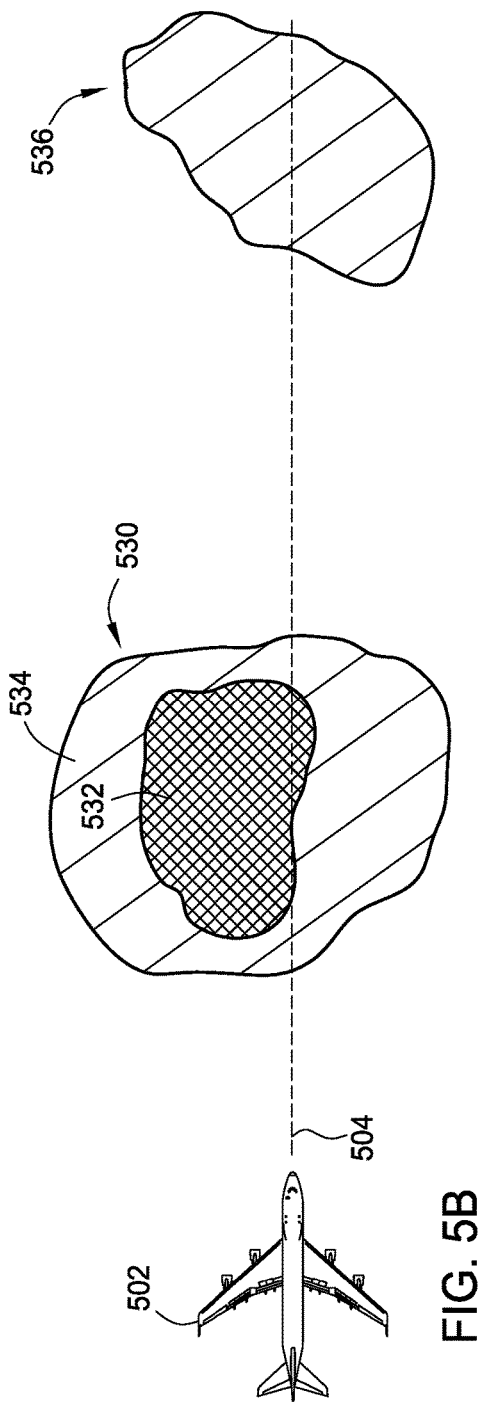
FIG. 5B illustrates an exemplary view of a display screen on the flight deck of the aircraft according to various embodiments that depicts the weather scenario of FIG. 5A.

FIGS. 5A and 5B illustrate an exemplary scenario 500 in which the computer 102 can combine pilot-selected altitude ranges with altitude ranges selected by the computer 102 for display on the aircraft display 112. Referring to FIG. 5A, an aircraft 502 may be flying at a cruise altitude of 32,000 feet, as indicated by flight path 504 (i.e., direction of travel). The pilot(s) of the aircraft 502 may have selected for display weather in altitude bands from 32,000 feet up to 40,000 feet, for example. However, airline standard operating procedures may direct the pilot(s) to fly at least 5,000 feet above any weather encountered en route. Thus, by receiving the current cruise altitude from the avionics 114, the computer 102 can automatically select altitudes from 32,000 feet down to 27,000 feet to complement the pilot-selected altitude range of 32,000 feet to 40,000 feet. In FIG. 5A, dashed line 506 represents the altitude 5000 feet below the flight path 504 of the aircraft 502. In this exemplary scenario 500, there is a first weather system 510 that is intersected by the flight path 504 of the aircraft 502. The weather system 510 includes an upper portion 512 that is at or above the flight path 504 and a lower portion 514 that is below the flight path. The exemplary scenario 500 also includes a second weather system 516 that is below the current flight path 504 but above the 5,000 foot spacing that may be required by the airline's standard operating procedures (thereby requiring the aircraft to climb higher and/or go around the weather 516). In addition, in this scenario, a third weather system 518 and a fourth weather system 520 are below the current flight path 504 of the aircraft 502 and also below the 5,000 foot spacing directive.

Referring now to FIG. 5B, the aircraft display 112 can provide a representation 530 of the first weather system 510 and a representation 536 of the second weather system 516. However, the third weather system 518 and the fourth weather system 520 are not shown on the aircraft display 112 because they are below the aircraft flight path 504 and below the 5,000 foot spacing. The representation 530 of the first weather system 510 can include an opaque region 532 that represents the upper portion of the weather 512 that is at or above the flight path 504 of the aircraft 502. The representation 530 can also include a partially transparent region 534 that represents the lower portion of the weather 514 that is below the flight path 504. The representation 536 of the second weather system 516 can be partially transparent throughout because the weather system 516 lies completely below the flight path 504 of the aircraft 502.

In block 218, the layered data for each weather product is geo-referenced, meaning that the layered data is positioned relative to locations on the ground (e.g., latitude and longitude). The layered data may be geo-referenced with respect to a digital map, such as a terrain map, an aviation chart, and/or an airway chart. The layered data may also be geo-referenced with respect to locations of airports, navigation stations (e.g. VOR stations), airway intersections, and the like. The layered data may also be georeferenced relative to the aircraft.

In blocks 220a-n, the computer 102 checks to see whether each of the different weather products has been selected for display by the pilots. For example, referring again to FIG. 7A, the pilot may select different weather products, such as clouds (button 730a), rain (button 730b), and hail (button 730c), for display on the aircraft display 112. If a particular weather product is selected, then, in block 220a-n, the computer 102 forwards the layered and geo-referenced weather data for the weather product to the aircraft display 112.

Referring now to FIG. 2B, in various embodiments, the process 200 performed by the computer 102 can also include automated hazard detection and warning. The process 200 can also provide automatic warning and/or reporting of weather encountered during the flight to ground stations and/or satellites. In FIG. 2B, the processing pipelines 206a-n shown in FIG. 2A are represented by a single pipeline 206 for the sake of simplicity. However, it should be understood that all of the pipelines 206a-n (e.g., for different weather products) shown in FIG. 2A can be present in FIG. 2B. In FIG. 2B, the data from each weather product (from pipelines 206a-n) can be provided to a hazard detection algorithm 252. The hazard detection algorithm 252 can analyze all of the weather data to identify various instances of detected weather hazards that should be reported to the user (e.g., pilots), reported to a ground station, and/or result in a diversion of the aircraft. A weather hazard may be any instance of weather data that, if encountered by the aircraft, could result in damage to the aircraft or injury to people onboard the aircraft. Examples of weather hazards may include severe thunderstorms, strong turbulence, and volcanic ash clouds. The hazard detection algorithm 252 may detect a weather hazard, such as severe weather (e.g., a severe thunderstorm), that is outside of the range of altitudes selected by the pilots and/or selected by the computer 102 (block 230). At block 254, the computer 102 can output imagery of the severe weather to the aircraft display 112, regardless of the pilots' selections. In various embodiments, after the imagery of the severe weather has been displayed, the pilot can optionally dismiss the data. Generally, the hazard detection algorithm 252, and computer 102 may only force imagery onto the aircraft display 112 in instances of severe weather hazards that may pose a safety risk to the aircraft and/or passengers. In various embodiments, less severe weather hazards that are detected outside of the range of altitudes selected by the pilots and/or selected by the computer 102 (block 230) may be indicated to the pilots by a text-based warning or an audible warning. For example, a textual message may be displayed on the aircraft display 112 or on a different display in the flight deck (e.g., an EICAS display, a primary flight display, an electronic flight bag display, or the like), as indicated by block 256. In various embodiments, the hazard detection algorithm 252 and the computer 102 can transmit gathered weather information to the ground and/or to a satellite. For example, various avionics 114 can gather information about regions through which the aircraft is flying, such as temperature data, humidity data, and wind data. The avionics 114 can also gather information about regions of turbulence (e.g., regions in which accelerometers on board the aircraft detect turbulent motion of the aircraft). In block 258, this weather data can be collected into the computer memory 106 and transmitted via the data transceiver 108 to a satellite and/or a ground station). Thereafter, the data can be analyzed and shared with other aircraft (e.g., as part of the received weather data (block 202)).

Figure 6:
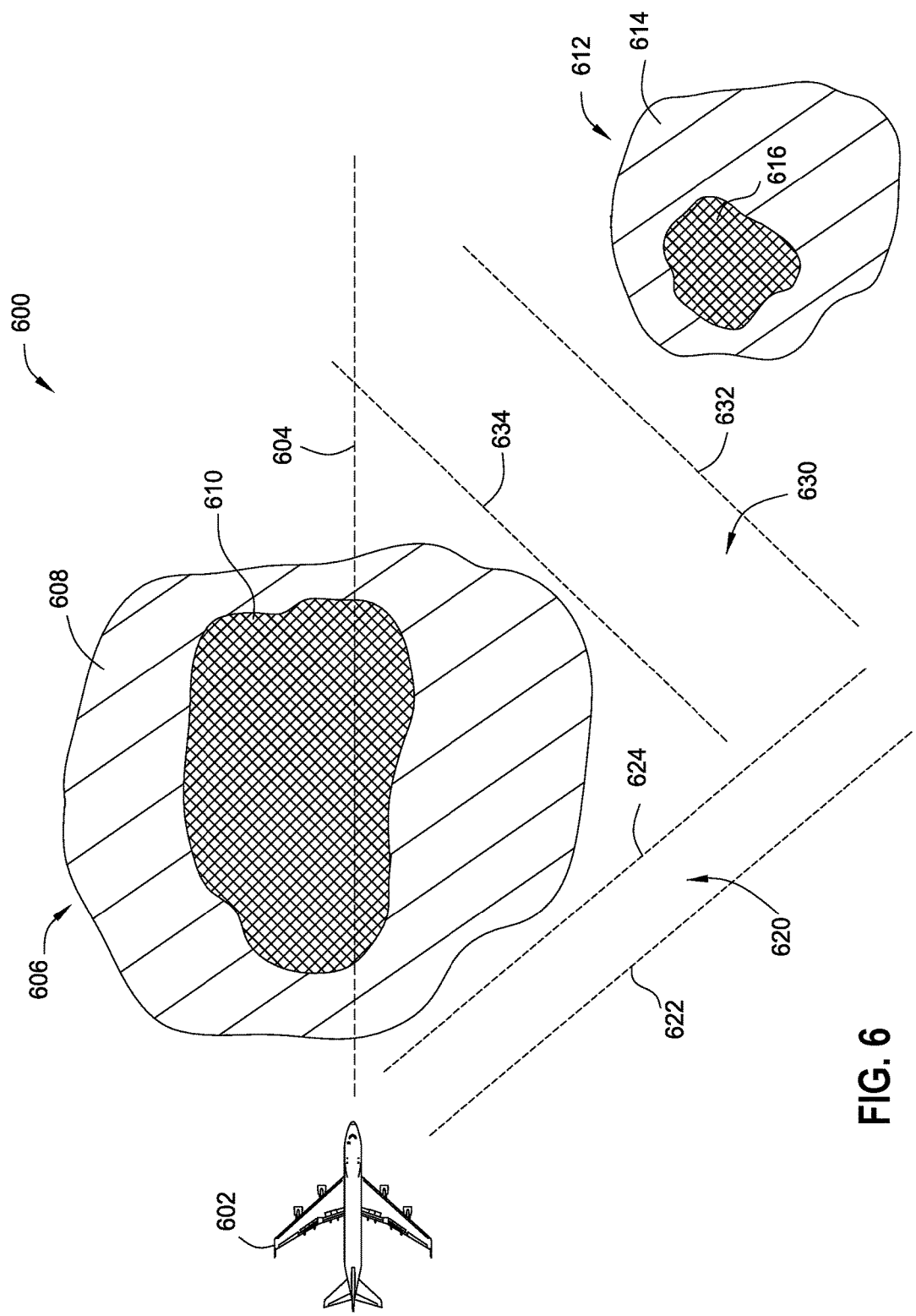
FIG. 6 illustrates an exemplary view of a display screen on a flight deck of an aircraft according to various embodiments that depicts a weather scenario and that also depicts suggested changes to a flight plan to avoid weather.

In various embodiments, in block 260, the computer 102 can communicate with the aircraft flight computer 116 to automatically provide route guidance to avoid weather along the flight path. FIG. 6 illustrates an aircraft display 112 for another weather scenario 600 in which an aircraft 602 is following a flight path 604. The flight path 604 may be a leg in a flight plan being executed by the aircraft flight computer 116. In this scenario 600, a region of weather 606 is in the flight path 604 of the aircraft 602. The aircraft display 112 indicates (by opaque portion 610) that a portion of the weather 606 is at or above the current altitude of the aircraft 602. The aircraft display 112 also indicates (by partially transparent portion 608) that a portion of the weather 606 is below the current altitude of the aircraft 602, but above standard operating procedure altitude spacing (discussed above). In this scenario 600, a second region of weather 612 is to the right of the flight path 604 of the aircraft 602. Again, the aircraft display 112 indicates (by opaque portion 616) that a portion of the second region of weather 612 is at or above the current altitude of the aircraft 602 and indicates (by partially-transparent portion 614) that a portion of the second region of weather 612 is below the current altitude of the aircraft 602. In this scenario 600, the computer 102 can calculate a route around the first instance of weather 606 and the second instance of weather 612. For example, the computer 102 can identify a first flight corridor 620 defined by boundaries 622 and 624, through which the aircraft can fly to steer around the first instance of weather 606. The computer 102 can identify a second flight corridor 630 defined by boundaries 632 and 634, through which the aircraft can fly to return to the flight path 604 by steering between the first instance of weather 606 and the second instance of weather 612. In various embodiments, the computer 102 can provide the corridors 620 and 630 (or provide plotted legs through the corridors 620 and 630) to the aircraft flight computer 116. The aircraft flight computer 116 can then automatically modify the flight plan to fly along the corridors 620 and 630. In various embodiments, the pilots must accept the changes to the flight plan before the flight plan is amended and/or executed. In various embodiments, the computer 102 may not be in direct communication with the aircraft flight computer 116. In such embodiments, the computer 102 can provide, via the aircraft display 112, a set of instructions for the pilots to input to the flight computer 116 to manually amend the flight plan.

Referring again to FIG. 2B, in various embodiments, the hazard detection algorithm 252 and the computer 102 can communicate with the pilot inputs 110 to provide suggested altitude ranges for display and/or suggested products for display. Referring again to FIG. 7A, an aircraft may be flying at 32,000 feet. Consequently, a pilot may have selected an altitude range from 30,000 feet to 35,000 feet. The pilot also may have selected a rain product (button 730b) for display. As shown in FIG. 7A, a weather field 702 on a display screen 700 may show a first weather area 710 of rain and a second weather area 712 of rain. Referring now to FIG. 7B, in an exemplary scenario, the hazard detection algorithm 252 may detect a region of hail (depicted by region 726) at an altitude of 28,000 feet. In various embodiments, the hazard detection algorithm 252 and the computer 102 may determine that the pilots should know that there is an unselected range of altitudes with a significant weather hazard (the region of hail 726). Consequently, the hazard detection algorithm 252 can provide an indication (via the pilot controls 110) of a range of control inputs that would show the missing weather activity. For example, the hazard detection algorithm 252 and computer 102 can add a third suggested slider 724 to the slide bar 714 to indicate to the pilots that the lower altitude slider 716 should be moved. The third suggested slider 724 may flash, be a different color, or the like, to attract the pilots' attention. Additionally, the product selection button 730c for the hail weather product can be highlighted (e.g., flashing, a different color, etc.) to indicate weather activity currently not display to the pilots. As discussed above with reference to block 254 of FIG. 2B, in instances of severe weather, the region of severe weather (in this exemplary scenario, a region of hail 726) can be automatically displayed to the pilot.

Figure 8:
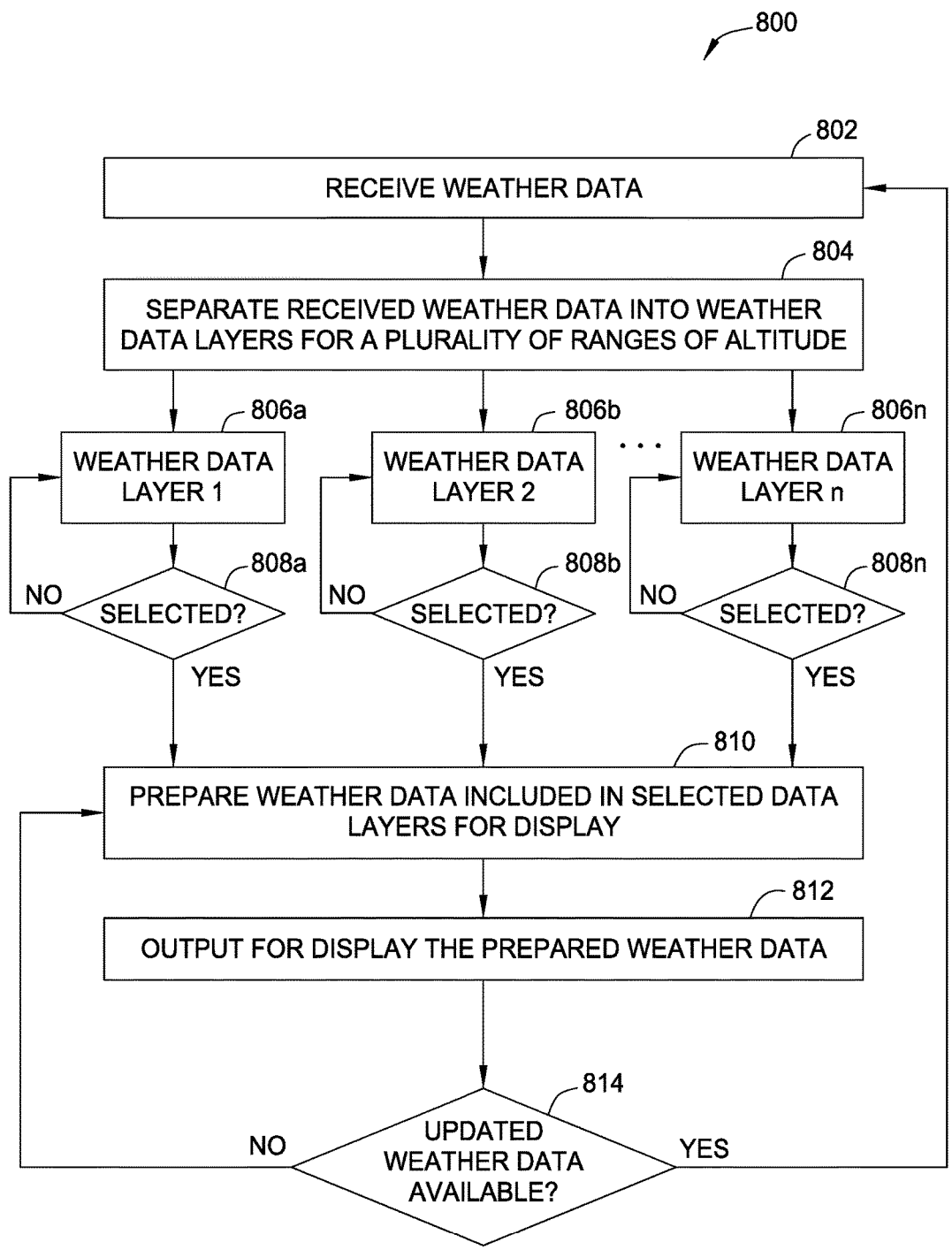
FIG. 8 illustrates a process according to various embodiments for preparing weather information for display.

FIG. 8 illustrates a process 800 that a weather display system can implement according to various embodiments. In block 802, weather data can be received. As described above, the weather data can be received via a data link to a ground-based and/or a satellite-based weather service. The received weather data can be stored in computer memory. In block 804, the received weather data can be separated into weather data layers based on a plurality of altitude ranges. Blocks 806a-n represent the separated weather data layers. In decision blocks 808a-n, respective weather data layers 806a-n are selected or are not selected. In block 810, the selected weather data layers are prepared for display. As described above, weather data from the selected weather data layers can be alpha blended and geo-referenced, for example. In block 812, the prepared weather data can be output for display (e.g., on a computer display screen). In block 814, a check can be made to determine whether updated weather data is available. For example, if new weather data has been stored in computer memory, then updated weather data is available. If updated weather data is not available, then the process returns to block 810. For example, during flight, the aircraft may be moving relative to the ground. Accordingly, a moving map display on which the weather data is being superimposed may be changing. The weather data may need to be geo-referenced again as the aircraft moves. If updated weather data is available, then the process returns to block 802 and receives the updated weather data.

In various circumstances, updated weather data may be available at a certain periodic rate (e.g., once per minute, once every five minutes, etc.). Thus, the process 800 can proceed from block 802 at the same periodic rate. However, between weather updates, the pilot(s) may change weather data layer selections. As indicated in blocks 808a-n, if a particular weather data layer 806a-n is not selected, then the process loops back to the respective weather data layer 806a-n. For example, if weather data layer 1 (block 806a) is not selected in block 808a, then the process 800 loops back to the weather data layer 1 (block 806a) to check for a selection again. This loop back can occur at a different periodic rate than weather data updates (e.g., once per second, five times per second, etc.). If an unselected layer is selected by the pilot(s), then the process can again prepare the weather data for display. As an exemplary scenario, assume that when weather data is received in a first instance (block 802), weather data layer 1 (block 806a) is not selected (block 808a). As a result, in block 810, the process 800 will not prepare weather data included in weather data layer 1 for display. If, before updated weather data is received, weather data layer 1 (block 806a) is selected (block 808a), then, in block 810, the process 800 will again prepare the weather data for display, this time with the weather data for weather data layer 1 (block 806a) included. As another exemplary scenario, assume that when weather data is received in a first instance (block 802), weather data layer 1 (block 806a) is selected (block 808a). As a result, in block 810, the process 800 will prepare weather data included in weather data layer 1 for display. If, before updated weather data is received, weather data layer 1 (block 806a) is de-selected (block 808a), then, in block 810, the process 800 will again prepare the weather data for display, this time without including the weather data for weather data layer 1 (block 806a). By operating the selection portion (blocks 806a-n and blocks 808a-n) as a faster periodic rate than a periodic rate at which weather data is received, the process 800 can quickly update the weather display independent of rates at which weather information may be received.

In various embodiments, the steps of process 800 can be performed on a ground-based and/or satellite-based computer system such that only weather data from selected weather data layers is transmitted to the aircraft. For example, a ground-based weather station (e.g., a weather data service provider) can include a computer system that receives weather data from one or more sources (e.g., Doppler radar stations, etc.) (block 802). The ground-based computer system can separate the received weather data into weather data layers for a plurality of altitude ranges (block 804), resulting in the weather data layers (blocks 806a-n). The ground-based computer system can receive weather data layer selections from the pilot(s) in the flight deck of an aircraft in flight (e.g., via a radio data communications link) and use the selections to enable or disable the various weather data layers 806a-n (block 808a-n). In block 810, the ground-based computer system can prepare the weather data included in the selected data layers for display. Finally, the ground-based computer system can output the prepared weather data to the aircraft (e.g., via a radio data communications link) for display on a computer display screen in the flight deck of the aircraft. As discussed above, between weather data updates, the pilot(s) may change weather data layer selections. In various embodiments, such changes in weather data selections can be transmitted in real time or in near real time to the ground-based such that the ground-based computer system can again prepare the weather information included in the selected weather data layers for display (block 810) and again output for display the prepared weather data 812 (block 812).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving weather data for use in a flight of an aircraft, wherein the weather data is updated at a first rate;
   separating the weather data into weather data layers for a plurality of ranges of altitude, wherein each weather data layer corresponds to a respective one of the plurality of ranges of altitude, and wherein the weather data is separated at the first rate;
   monitoring for a selection of at least one of the weather data layers, wherein monitoring is performed periodically at a second rate, and wherein the second rate is faster than the first rate;
   preparing for display weather data in the selected at least one of the weather data layers; and
   outputting, for display on a display screen in the aircraft, the weather data in the selected at least one weather data layer.

2. The method of claim 1, wherein the first rate is selected from the group consisting of: once per minute; once every five minutes; and once per second.

3. The method of claim 1, wherein preparing for display weather data in the selected at least one of the weather data layers is performed at the second rate.

4. The method of claim 1, wherein outputting, for display on the display screen in the aircraft, the weather data in the selected at least one of the weather data layers is performed at the second rate.

5. The method of claim 1, further comprising:
   identifying at least one weather hazard based on an analysis of the weather data.

6. The method of claim 5, further comprising:
   upon determining that the identified at least one weather hazard is located in a data layer not selected for display, outputting an indication that weather data layers that are not selected for display include at least one weather hazard.

7. A system, comprising:
   a receiver configured to receive weather data for use in a flight of an aircraft, wherein the weather data is received at a first rate;
   an interface in the aircraft configured to receive selections;
   a memory configured to store the received weather data;
   at least one computer processor, programmed to:
      separate the received weather data into weather data layers for a plurality of ranges of altitude, wherein each weather data layer corresponds to a respective one of the plurality of ranges of altitude, and wherein the weather data is separated at the first rate;
      monitor for a selection of least one of the weather data layers, based on received selections from the interface, wherein the monitoring is performed periodically at a second rate, and wherein the second rate is faster than the first rate;
      prepare for display weather data in the selected at least one weather data layer; and
      output, for display on a display screen, the weather data in the selected at least one weather data layer.

8. The system of claim 7, wherein the first rate is selected from the group consisting of: once per minute; once every five minutes; and once per second.

9. The system of claim 7, wherein the at least one computer processor prepares for display of weather data in the selected at least one weather data layer is performed at the second rate.

10. The system of claim 7, wherein the at least one computer processor outputs, for display on the display screen in a flight deck of the aircraft, the weather data in the selected at least one weather data layer is performed at the second rate.

11. The system of claim 7, wherein the at least one computer processor is further programmed to:
    identify at least one weather hazard based on an analysis of the weather data.

12. The system of claim 11, wherein the at least one computer processor is further programmed to:
    upon determining that the identified at least one weather hazard is located in a data layer not selected for display, output an indication that weather data layers that are not selected for display include at least one weather hazard.

13. The system of claim 7, wherein monitoring for the selection of the least one of the weather data layers, based on received selections from the interface further comprises:
    receiving the selection of the at least one weather data layer;
    calculating a trajectory of the aircraft;
    identifying at least one weather data layer different from the selected at least one weather data layer that is within a predefined range of altitudes of the calculated trajectory; and
    selecting the weather data layers corresponding to the received selection and the weather data layers identified as being within the predefined range of altitudes of the calculated trajectory.

14. The system of claim 7, wherein the at least one computer processor is further programmed to:
    detect a position and direction of travel of the aircraft;
    predict at least one future position of the aircraft, based on the detected direction of travel;
    transmit a request for weather data proximate to at least one of the detected position and predicted at least one future position; and
    receive, using the receiver, weather data proximate to at least one of the detected position and predicted at least one future position.

15. A non-transitory computer-readable medium containing computer program code that, when executed by operation of one or more computer processors, performs an operation comprising:
    receiving weather data for use in a flight of an aircraft, wherein the weather data is updated at a first rate;
    separating the weather data into weather data layers for a plurality of ranges of altitude, wherein each weather data layer corresponds to a respective one of the plurality of ranges of altitude, and wherein the weather data is separated at the first rate;
    monitoring for a selection of at least one of the weather data layers, wherein monitoring is performed periodically at a second rate, and wherein the second rate is faster than the first rate;
    preparing for display weather data in the selected at least one of the weather data layers; and outputting, for display on a display screen in the aircraft, the weather data in the selected at least one weather data layer.

16. The non-transitory computer-readable medium of claim 15, wherein the first rate is selected from the group consisting of: once per minute; once every five minutes; and once per second.

17. The non-transitory computer-readable medium of claim 15, wherein preparing for display weather data in the selected at least one weather data layer is performed at the second rate.

18. The non-transitory computer-readable medium of claim 15, wherein outputting, for display on the display screen in the aircraft, the weather data in the selected at least one weather data layer is performed at the second rate.

19. The non-transitory computer-readable medium of claim 15, the operation further comprising:
   identifying at least one weather hazard based on an analysis of the weather data.

20. The non-transitory computer-readable medium of claim 19, the operation further comprising:
   upon determining that the identified at least one weather hazard is located in a data layer not selected for display, outputting an indication that weather data layers that are not selected for display include at least one weather hazard.

* * * * *